US012811145B2

(12) United States Patent
Ohsawa

(10) Patent No.: US 12,811,145 B2

(45) Date of Patent: Nov. 24, 2026

(54) CATHODE ACTIVE MATERIAL AND PRODUCTION METHOD OF CATHODE ACTIVE MATERIAL

(71) Applicant: TOYOTA JIDOSHA KABUSHIKI KAISHA, Toyota (JP)

(72) Inventor: Ryosuke Ohsawa, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 3 days.

(21) Appl. No.: 18/964,726

(22) Filed: Dec. 2, 2024

(65) Prior Publication Data

US 2025/0286053 A1 Sep. 11, 2025

(30) Foreign Application Priority Data

Mar. 8, 2024 (JP) ................................ 2024-035971

(51) Int. Cl.

*H01M 4/525* (2010.01)
*C01G 53/42* (2025.01)

(Continued)

(52) U.S. Cl.

CPC ............ *H01M 4/525* (2013.01); *C01G 53/42* (2013.01); *H01M 4/0471* (2013.01);

(Continued)

(58) Field of Classification Search

None

See application file for complete search history.

(56) References Cited

U.S. PATENT DOCUMENTS

2003/0082453 A1* 5/2003 Numata .................. H01M 4/40 429/231.95
2006/0035151 A1* 2/2006 Kumeuchi ............ H01M 4/505 429/223

(Continued)

FOREIGN PATENT DOCUMENTS

JP 2015-082480 A 4/2015
JP 2019-145204 A 8/2019
JP 2023-036570 A 3/2023

OTHER PUBLICATIONS

Lee, S. "Revisiting Primary Particles in Layered Lithium Transition-Metal Oxides and Their Impact on Structural Degradation." Adv. Sci. 2019, 6, 1800843-180051. (Year: 2019).*

*Primary Examiner* — Alexander M Weddle

(74) *Attorney, Agent, or Firm* — SoraIP, Inc.

(57) ABSTRACT

The cathode active material includes a plurality of secondary particles. Each of the secondary particles includes three to twenty primary particles. The primary particles contain a lithium metal composite oxide. A structure of the lithium metal composite oxide is a layered-rocksalt structure. The particle size distribution of the primary particles has "$D_{min}$" of 0.3 μm or more and "$D_{FWHM}$" of 0.10 μm or more. The particle size distribution is number-based distribution. The $D_{min}$ indicates a smallest diameter in the particle size distribution. The $D_{FWHM}$ indicates full width at half maximum of a greatest peak of the particle size distribution.

3 Claims, 3 Drawing Sheets

(51) Int. Cl.
*H01M 4/02* (2006.01)
*H01M 4/04* (2006.01)
*H01M 4/36* (2006.01)

(52) U.S. Cl.
CPC ......... *H01M 4/366* (2013.01); *C01P 2004/51* (2013.01); *H01M 2004/021* (2013.01); *H01M 2004/028* (2013.01)

(56) References Cited

U.S. PATENT DOCUMENTS

| | | | | |
|---|---|---|---|---|
| 2012/0258358 | A1* | 10/2012 | Yura ....................... | H01M 4/02 429/209 |
| 2023/0080488 | A1 | 3/2023 | Wei et al. | |

* cited by examiner

FIG. 3

| No. | CHEMICAL COMPOSITION 1) | | | | MANUFACTURING METHOD | | PARTICLE SIZE DISTRIBUTION OF PRIMARY PARTICLES 3) | EVALUATION | |
|---|---|---|---|---|---|---|---|---|---|
| | Li [-] | Ni [-] | Co [-] | Mn [-] | D50 2) OF LITHIUM COMPOUNDS [μm] | WASHING WITH WATER | $D_{FWHM}$ [μm] | INITIAL RESISTANCE [%] | CAPACITY MAINTAINING RATE [%] |
| 1 | 1.1 | 0.8 | 0.1 | 0.1 | 9 | NONE | 0.06 | 100 | 80 |
| 2 | 1.1 | 0.8 | 0.1 | 0.1 | 20 | FOUND | 0.10 | 84 | 80 |
| 3 | 1.1 | 0.8 | 0.1 | 0.1 | 32 | FOUND | 0.21 | 84 | 95 |
| 4 | 1.1 | 0.8 | 0.1 | 0.1 | 39 | FOUND | 0.37 | 83 | 93 |
| 5 | 1.1 | 0.8 | 0.1 | 0.1 | 51 | FOUND | 0.51 | 85 | 91 |
| 6 | 1.1 | 0.8 | 0.1 | 0.1 | 72 | FOUND | 0.87 | 84 | 95 |

1) THE VALUES OF EACH COMPONENT REPRESENT THE MASS FRACTION (MOLE FRACTION).
2) IT IS A VALUE IN THE PARTICLE SIZE DISTRIBUTION OF THE MASS BASIS (VOLUME BASIS).
3) THIS IS A VALUE IN THE PARTICLE SIZE DISTRIBUTION BASED ON THE NUMBER OF PARTICLES.

CATHODE ACTIVE MATERIAL AND PRODUCTION METHOD OF CATHODE ACTIVE MATERIAL

CROSS-REFERENCE TO RELATED APPLICATION

This application claims priority to Japanese Patent Application No. 2024-035971 filed on Mar. 8, 2024, incorporated herein by reference in its entirety.

BACKGROUND

1. Technical Field

The present disclosure relates to a cathode active material and a production method of the cathode active material.

2. Description of Related Art

Japanese Unexamined Patent Application Publication No. 2019-145204 (JP 2019-145204 A) discloses a secondary particle formed by aggregating primary particles having an average particle size of no more than 1 μm.

SUMMARY

The secondary particle is an aggregate of the primary particles. Increase in discharge capacity can be anticipated by adjusting the size of the primary particles, for example. However, it is conceivable that there is room for improvement in battery resistance.

An object of the present disclosure is to reduce battery resistance.

1. A cathode active material includes a plurality of secondary particles.

Each of the secondary particles includes three to twenty primary particles.

The primary particles contain a lithium metal composite oxide.

A structure of the lithium metal composite oxide is a layered-rocksalt structure.

A particle size distribution of the primary particles includes

"$D_{min}$ of no less than 0.3 μm", and

"$D_{FWHM}$ of no less than 0.10 μm".

The particle size distribution is number-based distribution.

The $D_{min}$ indicates a smallest diameter in the particle size distribution.

The $D_{FWHM}$ indicates full width at half maximum of a greatest peak of the particle size distribution.

Conventionally, primary particles have a sharp particle size distribution. In the cathode active material of the present disclosure, the primary particles have a broad particle size distribution. That is to say, the $D_{FWHM}$ is no less than 0.1 μm. Although details of this mechanism are unknown, reduction in battery resistance is anticipated due to the primary particles having a broad particle size distribution. For example, there is a possibility that the presence of primary particles of various sizes coexisting promotes lithium (Li) diffusion within the secondary particles.

2. The cathode active material according to the above "1" may include, for example, the following configuration.

The $D_{FWHM}$ is no less than 0.21 μm.

When the $D_{FWHM}$ is no less than 0.21 μm, improved durability is anticipated, in addition to reduction of battery resistance. The broader particle size distribution can further promote ionic diffusion within the secondary particles. On the other hand, contact area between surfaces of the secondary particles and an electrolyte may decrease. As a result, it is conceivable that durability can be improved.

3. The cathode active material according to the above "1" or "2" may include, for example, the following configuration.

The $D_{FWHM}$ is no more than 0.87 μm.

4. The cathode active material according to any one of the above "1" to "3" may include, for example, the following configuration.

A composition of the lithium metal composite oxide is represented by the general formula $Li_{1-a}MO_2$ where a relation of "$-0.5 \leq a \leq 0.5$" is satisfied.

M includes at least one type selected from a group consisting of Ni, Co, Mn and Al.

5. A production method of a cathode active material includes the following (a) to (e).

(a) Preparing a metal hydroxide.

(b) Forming a mixture by mixing the metal hydroxide and a lithium compound.

(c) Synthesizing a lithium metal composite oxide by subjecting the mixture to a heat treatment under an oxygen atmosphere.

(d) Forming secondary particles by disintegration of the lithium metal composite oxide.

(e) Washing the secondary particles with water.

A $D_{50}$ of the lithium compound is no less than 20 μm.

The $D_{50}$ indicates a particle size at which an integrated value is 50% in a mass-based particle size distribution.

Lithium compounds are Li sources of lithium metal composite oxide. Large-particle-size lithium compounds are used. Further, the secondary particles are washed with water. Although details of this mechanism are not known, the combination of these processes tends to broaden the particle size distribution of the primary particles.

Hereinafter, an embodiment of the present disclosure (which may hereinafter be abbreviated to "present embodiment") and an example of the present disclosure (which may hereinafter be abbreviated to "present example") will be described. It should be noted, however, that, the present embodiment and the present example do not limit the technical scope of the present disclosure. The present embodiment and the present example are exemplary in all respects. The present embodiment and the present example are non-restrictive. The technical scope of the present disclosure includes all modifications that fall within the meaning and scope equivalent to the claims. For example, it is originally planned to optionally extract appropriate configurations from the present embodiment and optionally combine such configurations.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a table showing experimental results.

DETAILED DESCRIPTION OF EMBODIMENTS

Main Terms

Numerical ranges such as "m to n %" include upper and lower limits unless otherwise specified. That is, "m to n %" indicates a numerical range of "m % or more and n % or less". In addition, "m % or more and n % or less" includes "more than m % and less than n %". The terms "greater than or equal to" and "less than or equal to" are represented by an equal sign inequality sign "<". The terms "greater than" and "less than" are represented by inequality signs "<" that do not include equal signs.

All numerical values are modified by the term "approximately." The term "approximately" can mean, for example, ±5%, ±3%, ±1%, and the like. All numerical values can be approximations that may vary depending on the mode of use of the disclosed technique. All numerical values can be displayed with significant digits. The measured value may be an average value in a plurality of measurements unless otherwise specified. The number of measurements may be three or more, five or more, or ten or more. In general, it is expected that the reliability of the average value improves as the number of measurements increases. The measured value can be rounded by rounding based on the number of significant digits. The measured value can include errors and the like associated with, for example, the detection limit of a measuring device.

"Primary particle" refers to a solid particle having a boundary between particles that is the smallest unit of the particle and that is recognized as incapable of being further subdivided. The primary particles may also be referred to as "crystallites". "Secondary particle" refers to an aggregate of two or more primary particles.

The "particle size distribution of the primary particles" is based on the number of particles. The particle size distribution can be created by the following procedure. According to SEM (Scanning Electron Microscope), a powder is observed. For example, "JSM-IT710HR" manufactured by JEOL Corporation may be used. The same SEM device is exemplary, and any SEM device may be used as long as it has an equivalent function. Thirty secondary particles are randomly extracted. In 30 secondary particles, the particle size (maximum feret diameter) of each primary particle is measured. The maximum Feret diameter is the distance between the two farthest points on the contour of the primary particle. A number distribution of particle sizes is created.

Figure 1:
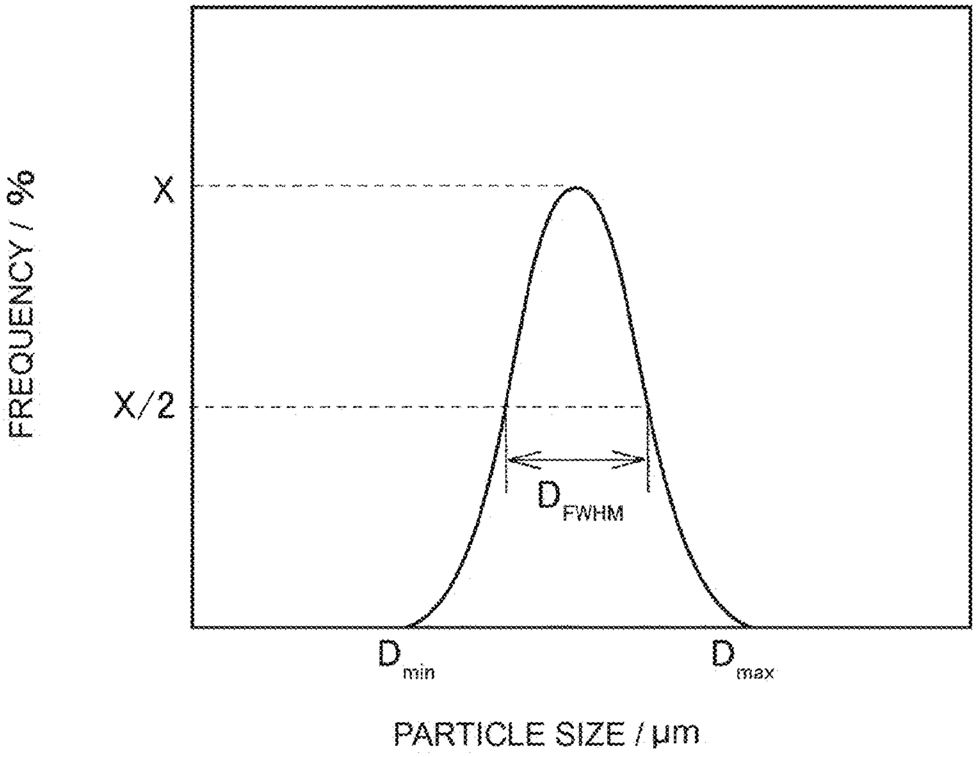
FIG. 1 is an explanatory diagram of a particle size distribution.

FIG. 1 is an explanatory diagram of a particle size distribution. The horizontal axis represents the particle size. The vertical axis is the frequency. "$D_{min}$" is the smallest diameter of the particle size distribution. $D_{min}$ may be, for example, a D1. "D1" indicates the particle size at which the integrated value is 1%. "$D_{max}$" is the largest diameter of the particle size distribution. $D_{max}$ may be, for example, a D99. "D99" refers to the particle size at which the cumulative value is 99%. The particle size distribution may be multimodal. The particle size distribution may be unimodal. The particle size distribution has a maximum peak. The "maximum peak" indicates a peak having a maximum height among the plurality of peaks. If the distribution is monomodal, a single peak is considered the maximum peak. At maximal peak, "$D_{FWHM}$" is measured. $D_{FWHM}$ indicates the full width at half maximum (Full Width at Half Maximum, FWHM) of the largest peak.

The "D50" of a lithium-compound is the mass-based particle size distribution. D50 indicates the particle size at which the integrated value is 50%. In the related art, the mass reference may be expressed as "weight reference", "volume reference", or the like. The particle size distribution on a mass basis can be measured, for example, by laser diffraction.

The stoichiometric composition formula represents a representative example of a compound. The compound may have a non-stoichiometric composition. For example, "$Al_2O_3$" is not limited to compounds having a material ratio (molar ratio) of "Al/O=2/3". Unless otherwise noted, "$Al_2O_3$" refers to compounds containing Al and O in any molar ratio. For example, the compound may be doped with a trace element. Some of Al and O may be substituted with another element. cathode active material Hereinafter, the cathode active material in the present embodiment may be abbreviated as "the present cathode active material". The cathode active material is for a secondary battery. That is, the present disclosure also provides a "cathode including the present cathode active material" and a "secondary battery including the present cathode active material". The secondary battery may be, for example, a liquid-based battery, a polymer battery, or an all-solid-state battery. The secondary battery may be, for example, a monopolar battery or a bipolar battery.

Secondary Particle

The cathode active material is an aggregate (powder) of secondary particles. The cathode active material includes a plurality of secondary particles. In the particle size distribution of the cathode active material (by mass), D50, for example, 0.1 μm or more, 1 μm or more, 5 μm or more, or may be 10 μm or more. D50 may be, for example, 30 μm or less, 25 μm or less, 20 μm or less, 15 μm or less, or 10 μm or less.

The secondary particles comprise from 3 to 20 primary particles. The number of primary particles indicates the number of primary particles that can be confirmed in SEM observation (surface observation) of the secondary particles. The number of primary particles may be, for example, 15 or less, 10 or less, or 5 or less. The number of primary particles may be, for example, 5 or more, 10 or more, or 15 or more.

Aspect Ratio of the Primary Particles

The primary particles may have, for example, an aspect ratio of from 1 to 2. The aspect ratio may be, for example, 1.8 or less, 1.6 or less, 1.4 or less, or 1.2 or less. The aspect ratio may be, for example, 1.2 or more, 1.4 or more, 1.6 or more, or 1.8 or more. "Aspect ratio" is the ratio of the major axis diameter to the minor axis diameter. The major axis diameter represents the maximum Feret diameter. The minor axis diameter represents the minimum Feret diameter.

Particle Size Distribution of Primary Particles

The particle size distribution has a $D_{min}$ greater than or equal to 0.3 μm. $D_{min}$ may be, for example, 0.6 μm or more, or 0.9 μm or more. $D_{min}$ may be, for example, 1.2 μm or less, 0.9 μm or less, or 0.6 μm or less.

The particle size distribution may have, for example, a $D_{max}$ of 3.0 μm or less. $D_{max}$ may be, for example, 2.7 μm or less, 2.4 μm or less, 2.1 μm or less, 1.8 μm or less, 1.5 μm or less, 1.2 μm or less, or 0.9 μm or less. $D_{max}$ may be, for example, 0.6 μm or more, 0.9 μm or more, 1.2 μm or more, 1.5 μm or more, 1.8 μm or more, 2.1 μm or more, 2.4 μm or more, or 2.7 μm or more.

The particle size distribution has a $D_{FWHM}$ greater than or equal to 0.10 μm. $D_{FWHM}$ may be, for example, 0.21 μm or more, 0.37 μm or more, 0.51 μm or more, or 0.87 μm or more. $D_{FWHM}$ may be, for example, 1.8 μm or less, 1.5 μm or less, 1.2 μm or less, 0.87 μm or less, 0.51 μm or less, 0.37 μm or less, or 0.21 μm or less.

Crystal Structure

The primary particles contain a lithium metal composite oxide. The primary particles may, for example, consist of a single crystal. The primary particles may comprise a lithium metal composite oxide. A structure of the lithium metal composite oxide is a layered-rocksalt structure. The layered rock salt type structure is also referred to as "α-$NaFeO_2$ type structure". The space group of the stratified rock salt type is "R-3m". Note that "-(bar)" is originally attached on "3", but is attached in front of "3" for convenience. The crystallization can be determined by the powder XRD (X-ray diffraction) method.

Chemical Composition

The lithium metal composite oxide may have any chemical composition. The lithium metal composite oxide may have, for example, a composition represented by the following general formula.

$$Li_{1-a}MO_2$$

Where $-0.5 \leq a \leq 0.5$ is satisfied. M includes at least one selected from the group consisting of Ni, Co, Mn, and Al.

The composition of the lithium metal composite oxide may be represented by, for example, the following general formula. The compounds represented by the formulae below may also be referred to as "NCM".

$$Li_{1-a}Ni_xCo_yMn_zO_2$$

Where $-0.5 \leq a \leq 0.5$, $0<x<1$, $0<y<1$, $0<z<1$, $x+y+z=1$ is satisfied. For example, a relationship of $0.5 \leq x<1$, $0<y \leq 0.25$, and $0<z \leq 0.25$ may be satisfied.

The composition of the lithium metal composite oxide may be represented by, for example, the following general formula. Compounds represented by the formulae below may also be referred to as "NCA".

$$Li_{1-a}Ni_xCo_yAl_zO_2$$

Where $-0.5 \leq a \leq 0.5$, $0<x<1$, $0<y<1$, $0<z<1$, $x+y+z=1$ is satisfied. For example, a relationship of $0.5 \leq x<1$, $0<y \leq 0.25$, and $0<z \leq 0.25$ may be satisfied.

A dopant may be added to the lithium metal composite oxide. The dopant may be diffused throughout the particle or may be local distribution. For example, dopants may be unevenly distributed on the particle surface. The dopant may be a substituted solid solution atom or an infiltrated solid solution atom. The amount of the dopant added (the material amount fraction with respect to the entire cathode active material) may be, for example, 0.01 to 5%, 0.1 to 3%, or 0.1 to 1%. One or more dopants may be added. Two or more dopants may form a complex. The dopant may include, for example, at least one selected from the group consisting of B, C, N, halogen, Si, Na, Mg, Al, Mn, Co, Cr, Sc, Ti, V, Cu, Zn, Ga, Ge, Se, Sr, Y, Zr, Nb, Mo, In, Pb, Bi, Sb, Sn, W, La, Ce, Pr, Nd, Pm, Sm, Eu, Gd, Tb, Dy, Ho, Er, Tm, Yb, Lu, and actinoid.

Production Method of Cathode Active Material

Figure 2:
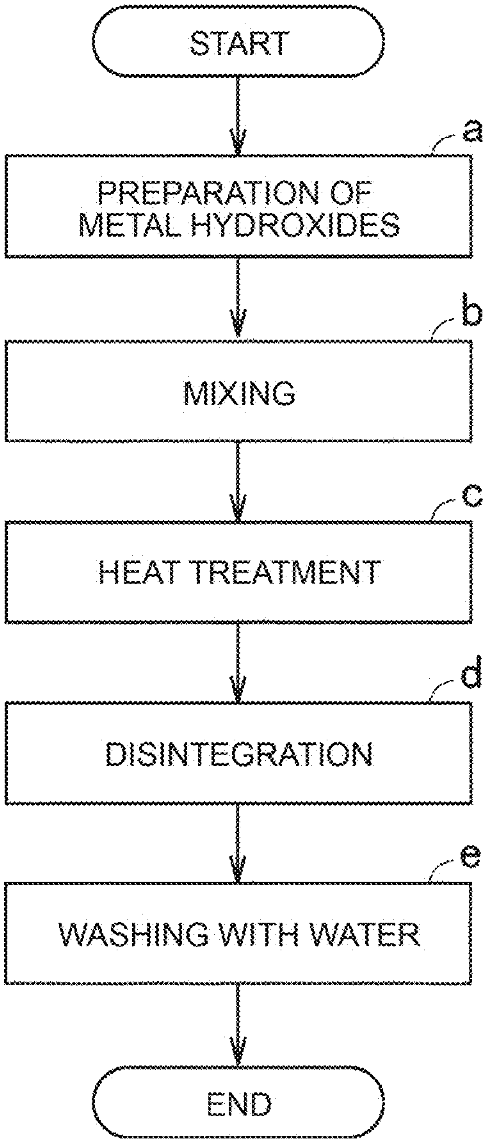
FIG. 2 is a schematic flow chart of a production method of a cathode active material according to the present embodiment.

FIG. 2 is a schematic flowchart of a production method of the cathode active material according to the present embodiment. Hereinafter, the production method of the cathode active material according to the present embodiment may be abbreviated as "the present production method". The production method includes "(a) preparation of metal hydroxide", "(b) mixing", "(c) heat treatment", "(d) disintegration" and "(e) water washing".

(a) Preparation of Metal Hydroxides

The method includes providing a metal hydroxide. Metal hydroxides are precursors of lithium metal composite oxides. The metal hydroxide may be synthesized, for example, by a coprecipitation method or the like. For example, a sulfate salt may be provided.

Sulfate, for example, may include at least one selected from the group consisting of $NiSO_4$, $CoSO_4$, $MnSO_4$, and $Al_2(SO_4)_3$. By dissolving the sulfate in water, a raw material solution is prepared. The mass concentration of the raw material solution may be, for example, 10 to 50%. By dropping the raw material solution into the alkaline aqueous solution, precipitation of the metal hydroxide can be generated. For example, the precipitate (metal hydroxide) may be recovered by filtration. After recovery, the metal hydroxide may be washed with water. After washing with water, the metal hydroxide may be dried.

(b) Mixing

The method includes mixing a metal hydroxide and a lithium compound to form a mixture. For example, in a mortar or the like, mixing and grinding of the material may be performed.

"Lithium-compound" refers to a compound comprising Li. The lithium compound may include, for example, at least one selected from the group consisting of LiOH, and $Li_2CO_3$. Lithium compounds are Li sources of lithium metal composite oxide. The ratio of the amount of Li to the amount of the metallic hydroxide (precursor) may be, for example, 0.5 or more, 0.75 or more, 1 or more, 1.1 or more, or 1.25 or more. The ratio may be, for example, 1.5 or less, 1.25 or less, 1.1 or less, 1 or less, or 0.75 or less.

The lithium compound is a powder. A D50 of the lithium compound is no less than 20 μm. D50 of the lithium-compound may be, for example, 32 μm or more, 39 μm or more, 51 μm or more, or 72 μm or more. D50 of the lithium compound may be, for example, 100 μm or less, 90 μm or less, 80 μm or less, 72 μm or less, 51 μm or less, 39 μm or less, or 32 μm or less.

(c) Heat Treatment

The method includes synthesizing a lithium metal composite oxide by subjecting the mixture to a heat treatment under an oxygen atmosphere. Any heat treatment apparatus, firing furnace may be used. For example, muffle furnaces, electric furnaces, etc. may be used.

The temperature of the heat treatment may be, for example, 800 to 1100° C. The temperature of the heat treatment may be, for example, 900° C. or higher, or 1000° C. or higher. The temperature of the heat treatment may be, for example, 1000° C. or less, or 900° C. or less. The time of the heat treatment may be, for example, 8 to 12 hours. The time of the heat treatment may be, for example, 9 hours or more, 10 hours or more, or 11 hours or more. The time of the heat treatment may be, for example, 11 hours or less, 10 hours or less, or 9 hours or less.

(d) Disintegration

The method includes crushing the lithium metal composite oxide to form secondary particles. The disintegration may be performed such that the secondary particles have a predetermined particle size. For example, crushing may be performed by a crusher. Any grinder (e.g., jet mill, etc.) can be used.

(e) Washing with Water

The method includes washing the secondary particles with water. By washing with water, the calcination residue of the lithium compound can be reduced. As a result of the reduction of the firing residue, for example, a reduction in battery resistance, an improvement in durability, and the like are expected. Production of cathode active material No. 1

The raw material solutions were formed by dissolving $NiSO_4$, $CoSO_4$, $MnSO_4$ in ion-exchanged water. In the feed solutions, the molar fraction of Ni, Co, Mn was "Ni/Co/Mn=1/1/1". The solute concentration in the raw material solution was 30% (mass fraction).

Ammonia water was placed in the reaction vessel. The inside of the reaction vessel was replaced with nitrogen while the ammonia water was stirred by the stirrer. Further, the reaction solution was formed by charging NaOH into the reaction vessel.

Precipitation (metallic hydroxide) was formed by dropping the raw material solution and ammonia-water into the reaction liquid so that the reaction liquid maintained a certain pH. The reaction solution was filtered to recover the metal hydroxide. A dispersion was formed by dispersing the metal hydroxide in ion-exchanged water. The dispersion was sufficiently stirred by the spatula. That is, the metal hydroxide was washed with water. After washing with water, the dispersion was filtered to recover the metal hydroxide. The metal hydroxide was dried at 120° C. for 16 hours to form a dry matter.

In a mortar, the dry matter (metallic hydroxide) and the lithium compound ($Li_2CO_3$) were mixed to form a blend. The ratio of the amount of Li to the amount of metallic hydroxide material was 1.1. D50 of the lithium-compound was 9 μm.

In the muffle furnace, the mixture was subjected to a heat treatment to synthesize a lithium metal composite oxide. Conditions of the heat treatment were as follows.

Atmosphere: Oxygen Atmosphere

Temperature: 800 to 1100° C.

Time: 10 hours

After the heat treatment, the lithium metal composite oxide was crushed by a jet mill. As described above, the cathode active material was produced.

No. 2

As with No.1, a dry matter (metallic hydroxide) was prepared. In a mortar, the dry matter (metallic hydroxide) and the lithium compound ($Li_2CO_3$) were mixed to form a blend. The ratio of the amount of Li to the amount of metallic hydroxide material was 1.1. D50 of the lithium-compound was 20 μm.

In the muffle furnace, the mixture was subjected to a heat treatment to synthesize a lithium metal composite oxide. Conditions of the heat treatment were as follows.

Atmosphere: Oxygen Atmosphere

Temperature: 800 to 1100° C.

Time: 10 hours

After the heat treatment, the lithium metal composite oxide was crushed by a jet mill to form secondary particles.

After crushing, 5 g powder (secondary particles) was charged into the ion-exchanged water of 50 mL to prepare the dispersions. The dispersion was stirred with a stirrer for 5 minutes. After stirring, the dispersion was filtered to recover the secondary particles. The secondary particles were dried at 120° C. for 16 hours. As described above, the cathode active material was produced.

No. 3 to No. 6

A cathode active material was produced in the same manner as in No.2 except that D50 of the lithium-compound was changed.

Evaluation

A cylindrical lithium-ion secondary battery (evaluation cell) was manufactured. The structure of the evaluation cell is as follows.

Power generation element: wound type cathode: cathode active material/AB/PVDF=88/10/2 (mass-ratio)

anode: anode active material (natural graphite), CMC, SBR

Electrolyte: $LiPF_6$ (1 mol/L), EC/DMC/EMC=3/4/3 (volume)

The cathode and the anode were manufactured by coating a slurry on the surface of a substrate (metal foil). As a coating apparatus, a film applicator (with a film thickness adjustment function) manufactured by All Good Co. was used. After coating the slurry, the coating was dried at 80° C. for 5 minutes.

The initial resistance of the evaluation cell was measured. FIG. 3 is a table showing experimental results. In FIG. 3, a relative value is shown in an item of "initial resistance". The relative values (percentages) were calculated by dividing the initial resistance of the respective evaluated cells by the initial resistance of No.1. The smaller the initial resistance, the lower the battery resistance is evaluated.

A durability test of the evaluation cell was performed. That is, charge/discharge was repeated 200 times in a range of 3.0 to 4.1 V with a constant current of 2 C. at room temperature. The capacity retention ratio (percentage) was determined by dividing the 200th discharge capacity by the first discharge capacity. The higher the capacity retention, the better the durability is evaluated.

Results

As shown in FIG. 3. when $D_{FWHM}$ was 0.10 μm or more, the cell resistivity tended to decrease. Furthermore, durability tended to improve when $D_{FWHM}$ was greater than 0.21 μm.

What is claimed is:

1. A cathode active material comprising a plurality of secondary particles, wherein each of the secondary particles includes three to twenty primary particles, the primary particles contain a lithium metal composite oxide, a structure of the lithium metal composite oxide is a layered-rocksalt structure, a particle size distribution of the primary particles includes $D_{min}$ of no less than 0.3 μm, and $D_{FWHM}$ of no less than 0.21 μm and no more than 0.87 μm, the particle size distribution is number-based distribution, the $D_{min}$ indicates a smallest diameter in the particle size distribution, and also the $D_{FWHM}$ indicates full width at half maximum of a greatest peak of the particle size distribution.

2. The cathode active material according to claim 1, wherein a composition of the lithium metal composite oxide is represented by a general formula $$Li_{1-a}MO_2$$

where a relation of $-0.5 \leq a \leq 0.5$ is satisfied, and also

M includes at least one type selected from a group consisting of Ni, Co, Mn and Al.

3. The cathode active material according to claim 1, wherein the $D_{min}$ is 0.6 μm or more, and is 0.9 μm or less.

* * * * *